May 10, 1949.  W. L. RUSSELL  2,469,462
NEUTRON WELL LOGGING
Filed Jan. 18, 1946  4 Sheets-Sheet 1

INVENTOR:
William L. Russell
BY
Newell Pottorf
Attorney

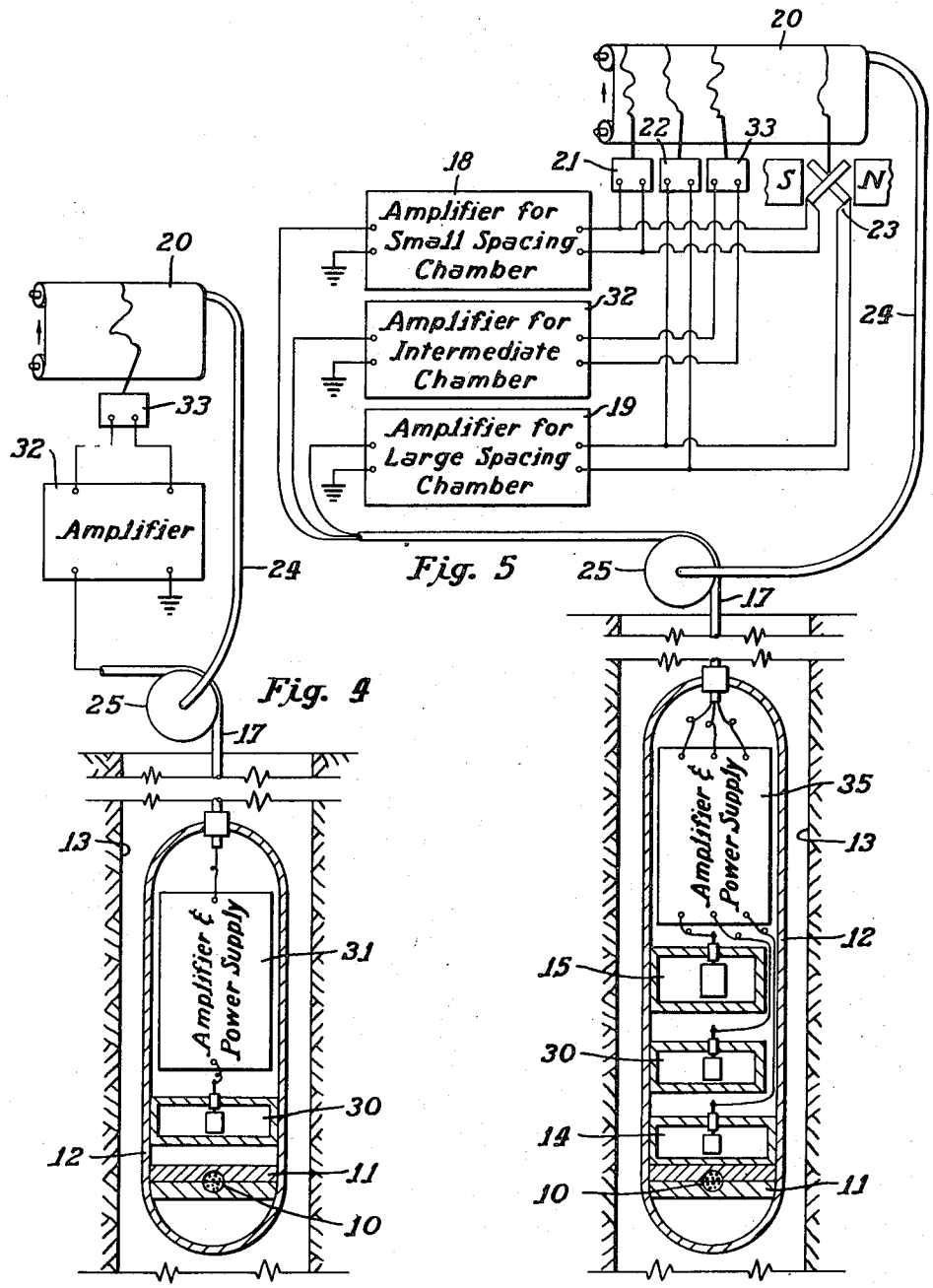

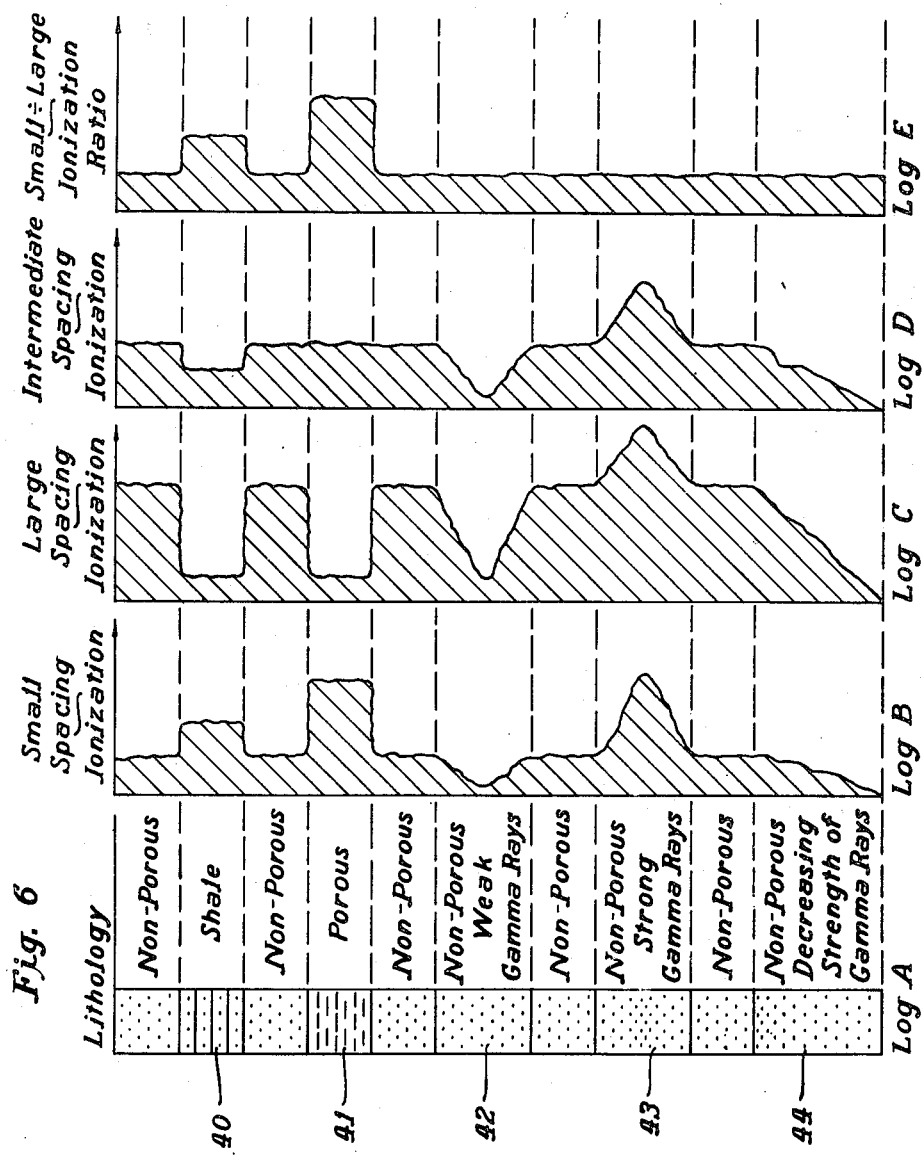

May 10, 1949.   W. L. RUSSELL   2,469,462
NEUTRON WELL LOGGING
Filed Jan. 18, 1946   4 Sheets-Sheet 4
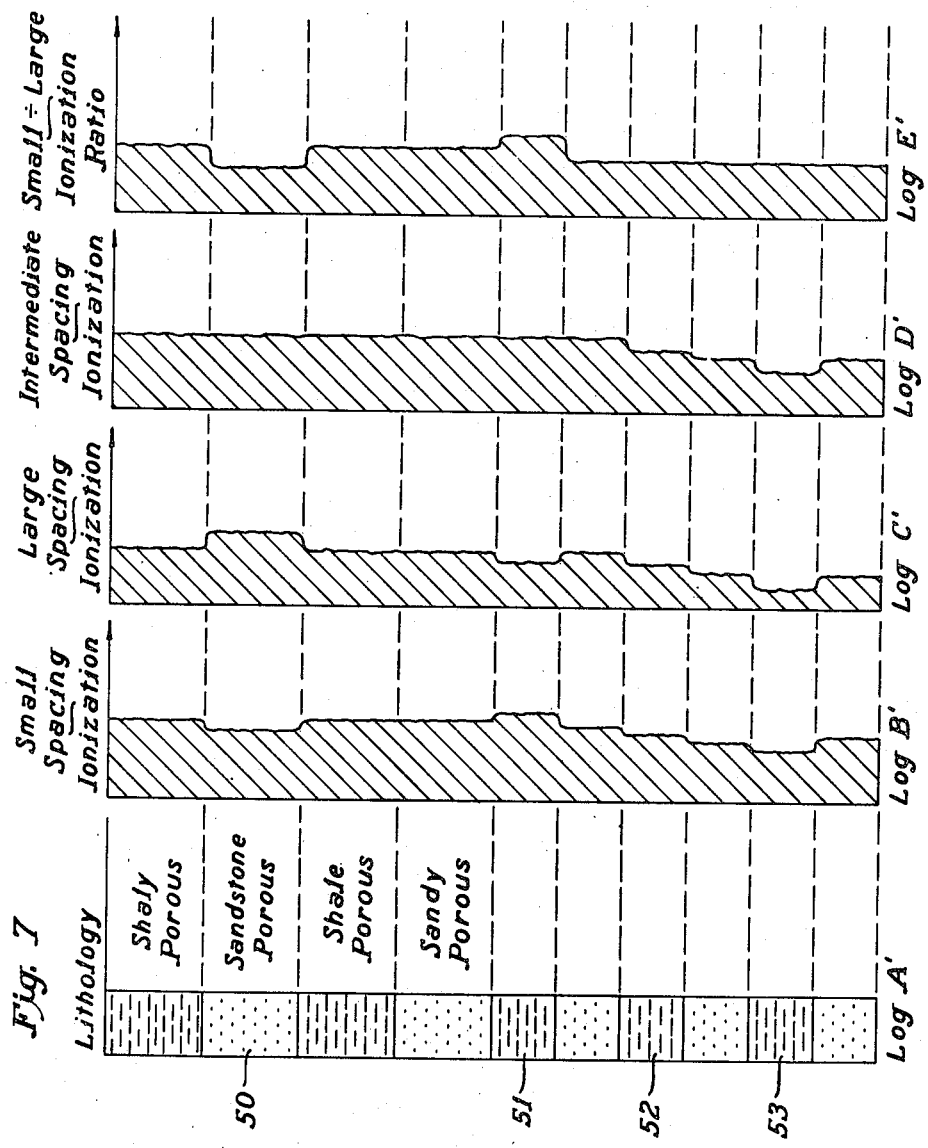
INVENTOR:
William L. Russell
BY Newell Pottorf
Attorney Patented May 10, 1949

2,469,462

UNITED STATES PATENT OFFICE 2,469,462

NEUTRON WELL LOGGING

William L. Russell, Tulsa, Okla., assignor to Stanolind Oil and Gas Company, Tulsa, Okla., a corporation of Delaware Application January 18, 1946, Serial No. 641,920

6 Claims. (Cl. 250—83.3)

This invention relates to the logging of wells and is directed particularly to that method of logging in which the well formations are irradiated by a source of neutrons and the effects thereby produced are recorded.

As is well known, high speed neutrons appear as one product of such atomic nuclear reactions as those occurring when certain elements are bombarded by high velocity atomic particles. Due to their lack of electrical charge, neutrons pass quite readily through ordinary substances, apparently undergoing elastic collisions with atomic nuclei in which very little energy is lost except when the nuclei are those of hydrogen having very nearly the same mass as the neutrons. Eventually, however, after many collisions the neutrons are slowed down to thermal velocities, whereupon the nuclei of certain elements are able to capture them in reactions of various types, some of which are characterized by the emission of gamma rays.

The presence and concentration of these slow neutrons can therefore be detected, either more or less directly by arranging for the capture to occur within the detector, such as the BF₃ ionization chamber, or indirectly by measuring the phenomena arising from capture outside the chamber. In the well logging method at present in most common commercial use the indirect approach of measuring the gamma rays of capture coming from outside the chamber has apparently been deemed preferable, for in this method a neutron source and a gamma ray detector spaced therefrom are passed through a well and the amplified detector output is recorded as a function of depth in the well.

In this situation it is apparent that the gamma ray detector output can be varied by two independent causes. Either the concentration of slow neutrons near the detector location can change due to a change in formation hydrogen content which produces the major slowing-down effect at a different distance from the neutron source; or, because of the widely varying abilities of the different atomic nuclei to capture neutrons, and because of the variety of phenomena accompanying such capture, a change in concentration of those elements chiefly responsible for the gamma rays of capture coming from the formations may produce a change in the ray intensity or hardness, or both. As a practical matter, however, this latter possibility is discounted in the interpretation of the present neutron well logs. A decrease, for example, in the detector output is taken to indicate an increase in hydrogen concentration whereby a larger fraction of the neutrons are slowed down and captured before penetrating the formations far enough for their gamma rays to produce an appreciable effect at the detector. As a result the estimation even of relative porosity values from the present neutron logs, on the assumption that hydrogen content and porosity are proportionally related, may be and often is considerably in error.

Also, with the method and apparatus now in use for neutron logging and using the neutron logs alone, there is no way of clearly distinguishing shales and shaly rocks, which sometimes have appreciable porosity but are of little economic value as oil and gas reservoirs, from more suitable reservoir rocks such as limestones, dolomites, and sandstones. The present practice is to run also a separate log of the natural radioactivity and estimate from this the locations and amounts of the shales, on the assumption that shales generally have greater radioactivity than other reservoir rocks. But this is not always true, for both shales and sandstones, for example, vary widely in radioactivity. Therefore, although this procedure is the best heretofore available, it sometimes leads to erroneous results. In addition, being run at different times and with different logging instruments which produce differences in cable stretch, the present separate neutron and natural radioactivity logs are subject to errors in depth measurement.

Further, the conventional neutron logs frequently are lacking in any proper basis for converting relative porosities to absolute values. The practice commonly used is to select what appears to be the least porous formation present as a standard for zero porosity and apply to the instrument readings opposite other formations a correction factor based on the response to the selected formation. However, it sometimes happens that the apparently non-porous formation has, in fact, appreciable porosity, in which even all porosity values for the well are in error because of the incorrect conversion factor assumed.

It is accordingly a primary object of my invention to provide a novel and improved method and apparatus for neutron well logging. Another object is to provide a neutron well logging method and apparatus giving better measurements of formation porosity, for the reason that shales may be distinguished from limestones, dolomites, and sandstones by a single set of logs run simultaneously. A further object is to provide a method and apparatus for neutron well logging capable of making clearer lithologic distinctions, so that, in addition to their porosities, the nature and identity of the rocks penetrated may be determined. Still another object is to provide a method and apparatus of the type described giving logs which may be correlated from well to well with greater certainty. A still further object is to provide for neutron well logging a method and apparatus giving information for differentiating between the hydrogen content of the well formations and other neutron-sensitive characteristics thereof; more specifically, it is desired to indicate the effect on neutron logs of the chemical elements other than hydrogen present in the formations. Another and still further object is to provide such a method and apparatus giving indications from which the absolute values of the porosities of the well formations may be computed. Other objects, uses, and advantages of the invention will become apparent as the description proceeds.

In general, these objects are accomplished by the use of one or more detectors spaced from a single neutron source by very carefully selected distances. Specifically, I have found that by a proper choice of the spacing between a neutron source and a single gamma ray detector, a well log can be made that is nearly independent of variations in hydrogen concentration. This log therefore indicates the presence of an evaluates other variables affecting the usual neutron log, such as an increase or decrease in hardness or intensity of the gamma rays of neutron capture which almost necessarily occurs with a change in concentration of the elements chiefly responsible for capture. Further, I have found that by properly combining the outputs of two gamma ray detectors at different carefully chosen distances from a neutron source, an indication is obtained from which the absolute value of the hydrogen concentration, and therefore of porosity in so far as it corresponds to the hydrogen content of the formations, may be determined. By my invention the information ordinarily combined into one log is separated into two well logs, the variations of which are of unique significance.

The principles of my invention and their application in a practical method and apparatus for well logging will be more clearly understood by reference to the drawings appended hereto for illustrative purposes and forming a part of this application. In these drawings, in which the same reference numeral in different figures refers to the same or a corresponding part:

Figure 4 is a cross section of a well with an embodiment of the invention therein for logging neutron-reactive properties of the formations other than hydrogen content;

Figure 5 is a cross section of a well with a preferred embodiment of the invention therein for simultaneously and independently logging both hydrogen content and capture gamma ray generating properties; and Figures 6 and 7 are representative well logs illustrating certain features of the interpretation of the logs obtained by use of the invention.

For the purposes of the present invention it may be assumed that in any one type of formation the intensity of the gamma rays of neutron capture at any given distance from a neutron source is proportional to the slow neutron density at that same distance. Also, as a practical matter, the porosity of a formation may be considered proportional to its hydrogen content.

Figure 1:
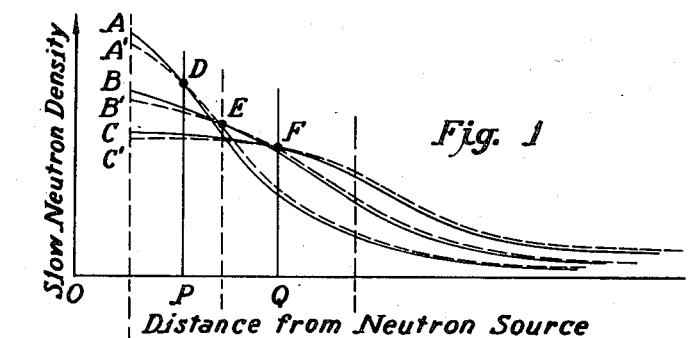
Figure 1 is a graphical representation of slow neutron distributions for different values of porosity or hydrogen content of well formations.

If for each of several formations of different porosity the density or number of slow neutrons per unit volume is plotted as a function of distance from the neutron source, a series of distribution curves are obtained like those of Figure 1. In this figure curve A may represent the distribution in a highly porous formation, while A' is the slow neutron density curve for another formation also highly porous but slightly less so. It will be observed that both of these curves have quite high values near the source and drop off rapidly, approaching zero asymptotically at a considerable distance. However, as curve A starts with a higher initial value and drops off more rapidly than curve A', they intersect at a point D, which is thus a point of no change in slow neutron density with varying porosity for highly porous formations. In other words, as the slow neutron density at this distance OP from the source does not vary with small changes in porosity or hydrogen content, attempts to measure such changes by observations at this distance would be quite ineffective.

Curves B and B' similarly are the slow neutron distributions obtained in two formations of intermediate but slightly different porosities. Like A and A' curves B and B' decrease asymptotically though less rapidly toward zero at a distance, after starting at intermediate high values. The shift observed may be explained as due to the fact that the fast neutrons must on the average traverse more material in the less porous formations before being slowed to thermal velocities. Curves B and B' similarly intersect, but at a slightly greater distance from the source than OP, at the point E. At this distance the slow neutron density is insensitive to small changes in intermediate values of porosity.

In the same manner curves C and C' represent slow neutron distributions in two media of low but slightly different porosities. Their initial values are still smaller than those of curves B and B', and they also decrease toward zero, but even more slowly. Their point of intersection F at the distance OQ has the same significance as the points D and E.

Looking at this family of curves, it is clear that the points D, E, and F lie on or define a curve of zero neutron density variations for varying porosities. In other words, in the region PQ the slow neutron density is not a good indicator of formation porosity or hydrogen content. Outside of this region the slow neutron densities vary either directly or inversely with the porosities depending on whether the distance of the point of observation is, respectively, less than OP or greater than OQ.

Figure 2:
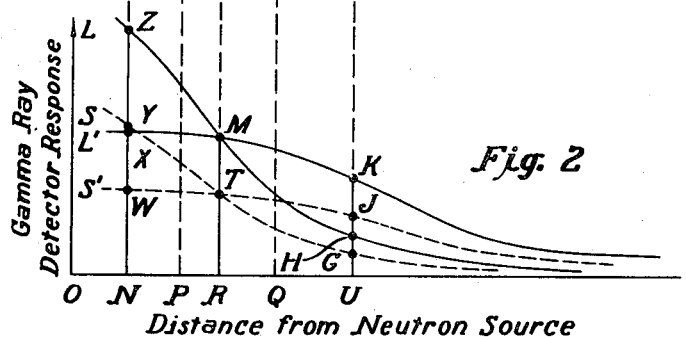
Figure 2 is a graphical representation of gamma ray detector response as a function of position with reference to a neutron source for various representative porous and non-porous formations.

Since the capture gamma ray intensity at a detector surrounded by a given slowing and absorbing medium is proportional to the slow neutron density at the detector location, the curves shown in Figure 2 may be deduced from those of Figure 1. Thus, the curve L of Figure 2 may represent the capture gamma ray intensity as a function of distance from the neutron source in a highly porous limestone, dolomite, or sandstone, in which the slow neutron density curve resembles A of Figure 1. However, since shale, due to its chemical composition, is less efficient at producing gamma rays of neutron capture than most other and more suitable reservoir rocks, a highly porous shale, of the same porosity and slow neutron distribution as the rock producing curve L, would give the gamma ray intensity curve S.

If, on the other hand, the limestone, dolomite, or sandstone is relatively non-porous, having a slow neutron distribution corresponding to curve C of Figure 1, the gamma ray intensity curve L' of Figure 2 would be observed. For an equally non-porous shale with the same slow neutron distribution the corresponding gamma ray distribution curve might be represented by the curve S'.

From these two figures considered together a number of important facts emerge. Since curves L and L' intersect at M, a gamma ray detector centered at this distance OR and measuring the value RM would be relatively insensitive to the differences in porosity in the limestone, dolomite, or sandstone. It will be observed that the shale curves S and S' also intersect at about the same distance OR, at the point T. Therefore this same gamma ray detector would also be insensitive to differences in shale porosity; but since its response in the shales would only be the value RT, it would readily indicate whether the formation is limestone or shale. In other words, the major changes in output of a detector centered at the distance OR would produce a neutron well log related primarily to the lithology, in so far as the different rock types have differing abilities to generate gamma rays upon capturing neutrons. Of course, it is clear from Figure 1 that, due to the fact that not all neutron distribution curves intersect at this distance OR, there would be a minor variation in this detector output due to porosity changes; but this would never be enough to obscure the major variations due to lithologic changes.

Another consequence of importance deducible from these curves is this: If a second gamma ray detector be centered at some distance outside of the region PQ, such as at the distance OU where the slow neutron density clearly varies as some inverse function of the porosity, then the output of this detector will vary with both porosity and lithology, as is evident in Figure 2. However, upon taking the ratios of two detector outputs at different distances, such as the ratio of the output at R to the output at U, the numerical value of this ratio for the porous limestone will be found very nearly equal to its value for the porous shale. That is, $$\frac{MR}{HU} = \frac{TR}{GU} = p_1$$

Upon taking the ratios for the non-porous limestone and the non-porous shale, they will also be found approximately equal but of smaller numerical value than $p_1$. In other words, $$\frac{MR}{KU} = \frac{TR}{JU} = p_2 \text{ and } p_1 > p_2$$

Clearly the corresponding ratios for gamma-ray response curves derived from a neutron distribution corresponding to curve B would have values intermediate between $p_1$ and $p_2$. Thus, it is apparent that these ratios $p_1$ and $p_2$ are correlatable with the formation porosities and vary only in a minor way, if at all, with the lithology.

An even better ratio for indicating porosity would result from using the output of a detector at a position where the slow neutron density varies with the porosity as a direct function, rather than using the output of the detector in the region PQ where the variation, though small, may be either a direct or an inverse function. This would be true for any detector centered at a distance less than OP; for example, at the distance ON. The high porosity of the limestone and the shale would then be indicated by the ratios $$\frac{ZN}{HU} = \frac{YN}{GU} = p_1'$$

where obviously $p_1' > p_1$;
and the low porosities would be determined from the ratios $$\frac{XN}{KU} = \frac{WN}{JU} = p_2'$$

where $p_2'$ is not much different from $p_2$. With this arrangement the porosity data would thus be indicated on an expanded scale, so that smaller porosity differences could be reliably measured.

Figure 3:
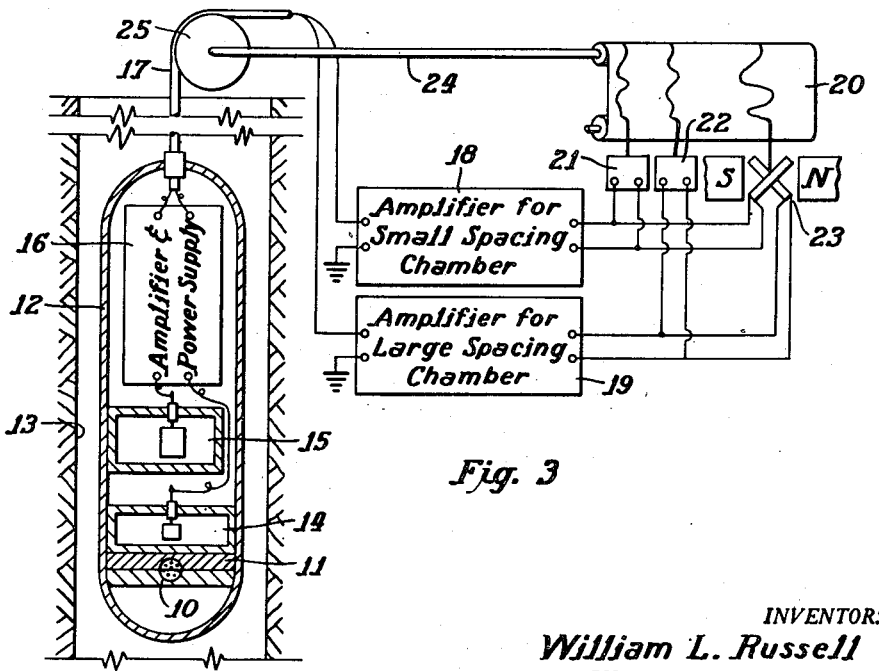
Figure 3 is a cross section of a well with an embodiment of the invention therein for recording porosity data.

These principles are applied in the apparatus of Figure 3 for logging the data from which the absolute values of the porosity may be determined. Thus a source of neutrons 10, which preferably does not emit gamma rays, is located within a fluid-tight container or housing 12 for passage through a well 13.

Although the neutron source 10 could be formed of any neutron emissive materials, such as a mixture of radium and beryllium, a gamma-ray-free source has distinct advantages in this invention in that little or no shielding is needed to prevent radiations from passing directly from the source to the gamma ray detector. The space nearest the source that would ordinarily be taken up by shielding material can then be occupied by a detector. Accordingly, it is preferred to use in this instrument a source of polonium and beryllium surrounded by only a small amount of shielding 11.

Within container 12 at different spacings from source 10 are two gamma ray detectors 14 and 15, which for illustrative purposes are shown as ionization chambers but may be any other type, such as Geiger-Mueller counters, capable of responding to gamma rays. Container 12 may also house other equipment, such as the usual power supplies and amplifiers 16, required for the operation of detectors 14 and 15 and for transmission of their signals to the earth's surface over cable 17. At the surface these signals from the detectors 14 and 15 may be further amplified as needed by separate amplifiers 18 and 19, respectively, and the separate outputs recorded on chart 20 by recorders 21 and 22. The two amplifier outputs are also applied to the crossed coils of a recording ratio meter 23, which similarly records on chart 20. This chart is preferably driven in accordance with the depth of the instrument in well 13 by a driving connection 24 from a measuring sheave 25 over which cable 17 passes.

Although, as mentioned in the discussion of Figures 1 and 2, it is sufficient to take the ratio of response of detectors 14 and 15 for any two spacings from source 10 so long as they are unequal, greater sensitivity can be obtained by choosing certain spacings as indicated in those figures. Detector 14 closest to source 10 should be centered approximately at the distance ON so that its response is clearly a direct function of the porosity. Detector 15 should preferably be spaced at some distance such as OU greater than OQ where its response is an inverse function of the porosity, but not so far from source 10 that natural radioactivity or other background noise forms any large portion of its response. With detectors 14 and 15 thus positioned, so that the response of one is in the opposite direction to that of the other for a given change in hydrogen content, the sensitivity of the instrument to such changes will be greater than when using either detector alone.

Referring now to Figure 4, I have there shown the embodiment of my invention for logging neutron-responsive properties of the well formations other than their hydrogen content. Within the instrument casing 12 are fixed the source of neutrons 10, thin shield 11, and, spaced therefrom, a single detector 30. The amplifier and power supply unit 31 operates detector 30 and transmits its indications over cable 17 to the surface for further amplification, as needed, by amplifier 32 and recording on chart 20 by recorder 33.

Superficially this resembles the usual neutron logging instrument employing a source and single gamma ray detector, but there is the very important difference that the detector 30, which in conventional neutron logging is usually spaced at a greater distance than OQ of Figure 1, is in this case centered approximately at the distance OR. In this position, as has been indicated, changes in hydrogen content of the formations produce only minor variations in the detector response, and an entirely new and different type of information about the well formations is obtained.

In Figure 5 is shown the preferred embodiment of my invention in which, by the use of several detectors with a single neutron source, the maximum amount of information is obtained about the neutron-responsive properties of well formations. As is believed apparent, this instrument is a combination of the two instruments shown in Figures 3 and 4, the two detectors 14 and 15 being placed within housing 12 with the detector 30 located between them. The amplifiers and power supply for all three detectors are included in the unit 35 which transmits the signals to the surface for recording on the chart 20 in the same manner as in the previous embodiments.

In this embodiment the detectors 14 and 15 are spaced so as to give the maximum sensitivity in the manner pointed out in the discussion of Figure 3. The detector 30 here, as in Figure 4, is spaced as nearly as possible at the distance OR. On the chart 20 four traces are recorded side by side, one for each of the three detectors and one for the ratio of the output of detector 14 to that of detector 15.

In Figure 6 are shown these same four logs for a hypothetical well section, the actual lithology of which might be as represented by log A at the left. The various strata 40, 41, 42, 43, and 44 are separated by non-porous strata, and logs B, C, D, and E correspond to the amplified outputs of detectors 14, 15, 30 and the ratio of 14 to 15, respectively. Log C corresponds to the usual neutron log as made by present commercial equipment; logs D and E are the two new logs made available by this invention; and log B may be recorded or not as desired, since it is not an independent curve, but on occasion may assist in interpretation. As a matter of fact, logs D and E carry all of the essential information desired of this type of neutron logging and are the only ones that need be recorded.

One the basis of the conventional neutron log C it might be thought that strata 40, 41, and 42 all have porosities of about the same value. On the other hand, stratum 40, although mainly composed of shale, may still have a medium porosity as is true of many shales which have not been deeply buried; 41 may be a quite porous sand or lime; and 42 may be quite non-porous. Thus, log D shows that there is a decrease in gamma ray emission in stratum 40 due to capture of neutrons by a set of elements different from those in the non-porous strata or in the sandstone 41. This might account for most of the decrease appearing on log C except that log E, indicating an appreciable porosity for stratum 40, shows that part of the decrease in log C is due to porosity. The correct conclusion is thus reached that there is a change both in porosity and in gamma ray emission at stratum 40, from which data it may be correctly concluded that it is a porous shale. There being no corresponding decrease in emission shown by log D for stratum 41, it is correctly shown by log E to be the most porous formation present. Stratum 42, however, is shown by log D to have a strong decrease in gamma ray emission, either because of neutron capture by elements which do not emit gamma rays in the process, or because the emitted rays are less penetrating. In any event, the ratio of log B to log C shown by log E remains the same for this stratum as for the neighboring non-porous ones, indicating that no part of the change noted on log C is due to porosity, but it is to be entirely accounted for by the emission decrease seen on log D. This may properly be interpreted as being a non-porous shale.

The reverse situation occurs with stratum 43. Log D shows that there is an appreciable increase in gamma ray emission, such as may be due to capture by elements emitting quite strong gamma rays in the capture process. On the other hand, log E demonstrates that the ratio of log B to log C is unaffected by this change, the porosity remaining very low. While in the case of stratum 44, log C might be taken to indicate an increase of porosity with depth, log D shows that this is not the case, and that there is rather a decline in gamma ray emission. The ratio recorded by log E remains the same, for there is no difference between the porosity of stratum 44 and that of the neighboring non-porous stratum.

Figure 7 illustrates another useful feature of my invention. In this instance the five logs A', B', C', D', and E' correspond to logs A, B, C, D, and E of Figure 6. From log A' the lithology is assumed to be alternate strata of more or less porous sandstone and shales, all of which have appreciable porosity. There is in fact no truly non-porous formation present.

Using log C' in the conventional manner, stratum 50 would be chosen as a reference and considered non-porous, and a magnifying correction factor based on this stratum would be applied to all the other values on this log. However, log E' demonstrates amply the fact that the differences in porosity between all the strata in this section are not large, and that even stratum 50 has appreciable porosity. Stratum 51 is shown by log E' to have the greatest porosity, and is differentiated by log D' from stratum 52, which from log C' appears to have the same porosity as stratum 51, while in fact there is a slight decrease in gamma ray emission. Stratum 53 might be thought from log C' to be the most porous one in the logged section, but log D' shows the decreased gamma ray generation, and log E' demonstrates that the porosity actually is nearly constant throughout this lower half of the section logged. Log E' here provides an indication from which may be derived absolute porosity values much more reliable than the values estimated by applying a correction factor as is now generally done. The latter method would lead to positively erroneous results in a case like the present.

Since the neutron distribution and gamma ray response curves of Figures 1 and 2 have been somewhat idealized to bring out the principles of this invention, it will, of course, be understood that the readings of logs E and E' must be used with certain precautions in arriving at absolute porosity values. In actual practice these readings vary to some extent with such factors as the diameter of the logging instrument, the diameter of the well bore, the nature of the fluids in the well, the presence or absence and thickness of cement and well casing, and the like, all of which factors are quite unrelated to formation porosity. Therefore, it is contemplated that each logging instrument will first be calibrated by determining its response to formations of known porosity in wells where the other variable factors are also known, so that their influence can be evaluated. Thereafter it is a relatively simple matter to apply to the instrument readings on unknown formations the necessary correction factors, given the essential information as to diameter, hole fluids, etc., which can be independently ascertained.

Also, because of the influence of these variable factors and, to some extent, because of differences in initial velocities of the neutrons which depend on the particular source used, it is impossible to give exact distances or dimensions. As an approximation, however, it may be stated that the distance OP of Figure 1 is generally from 3 to 6 inches, and the distance OQ is in the neighborhood of 8 to 10 inches, although such figures are not to be considered limiting. In a few cases the zero change distances may fall outside of them, and they are properly determined experimentally.

However, with the polonium-beryllium source 10 described above, or any other source giving neutrons of similar initial velocities, it can be seen from Figure 2 that ON, the spacing for the closest detector 14 may be about half the distance OP, of from 1½ to 3 inches; the spacing OU for the farthest detector 15 can be anything greater than OQ, and therefore greater than 9 or 10 inches, for example, 12 to 15 inches; while the spacing OR of the intermediate detector 30 is intermediate between the distances OP and OQ, and therefore is from about 6 to 7 inches.

While I have set forth the principles of my invention in terms of certain specific embodiments, it will be apparent to those skilled in the art that many modifications thereof are possible. The scope of my invention should therefore not be considered as limited to the specific embodiments described, but is to be defined by the scope of the appended claims.

I claim:

1. The method of well logging which comprises the steps of irradiating the formations of a well with fast neutrons from a concentrated source thereof, measuring at a plurality of distances from said source the gamma rays of capture of said neutrons after they have been slowed down by passage through said formations, one of said distances being that at which changes in formation hydrogen content produce substantially no change in slow neutron concentration, and indicating as a function of depth in said well the magnitudes of the measurements at said distances.

2. The method of well logging which comprises the steps of irradiating the formations of a well with fast neutrons from a concentrated source thereof, measuring at a distance from said source where changes in the formation hydrogen content produce substantially no change in slow neutron concentration the gamma rays of capture of said neutrons after they have been slowed by passage through said formations, and indicating as a function of depth in said well the magnitude of the measurement at said distance.

3. The method of well logging which comprises the steps of passing through a well a source of neutrons and a plurality of gamma ray detectors spaced from said source, one of said detectors being spaced at a distance where changes in hydrogen content of the surroundings produce substantially no change in the concentration of slow neutrons, and indicating as a function of depth in said well the responses of said detectors.

4. The method of well logging which comprises the steps of irradiating the formations of a well with fast neutrons from a concentrated source thereof, said source being substantially free of substances emitting penetrating gamma radiations, measuring at two distances from said source the gamma rays of capture of said neutrons after they have been slowed by passage through said formations, the first of said distances being one at which the slow neutron density varies as a direct function of the formation porosity, and the second of said distances being one at which said density varies as an inverse function of said porosity, and indicating as a function of depth in said well the ratio of the magnitude of the measurement at said first distance to the magnitude of the measurement at said second distance.

5. Apparatus for logging wells comprising an instrument casing adapted to be lowered into a well, a source of neutrons within said casing, a plurality of gamma ray detectors in said casing at different spacings from said source, one of said spacings being substantially that at which the concentration of slow neutrons remains substantially constant for varying hydrogen content of the media surrounding said casing, and means for indicating as a function of depth in said well the response of each of said detectors.

6. The method of well logging which comprises the steps of passing through a well a source of neutrons and at least two gamma ray detectors having substantially similar frequency responses, said detectors being spaced from said source by different distances, one of said distances being a spacing at which the slow neutron concentration increases and the other of said distances being a spacing at which said concentration decreases with an increasing concentration of hydrogen in the formations of said well, and indicating as a function of depth in said well the ratio of the responses of two of said detectors.

WILLIAM L. RUSSELL.

REFERENCES CITED

The following references are of record in the file of this patent:

UNITED STATES PATENTS

| Number | Name | Date |
| --- | --- | --- |
| 2,289,926 | Neufeld | July 14, 1942 |
| 2,296,176 | Neufeld | Sept. 15, 1942 |